United States Patent
Mundt

[19]

[11] Patent Number: 5,815,379
[45] Date of Patent: Sep. 29, 1998

[54] PIVOTABLE COMPUTER ACCESS DOOR STRUCTURE HAVING CONCEALED, BREAK-AWAY HINGE MECHANISM

[75] Inventor: Kevin W. Mundt, Spring, Tex.

[73] Assignee: Compaq Computer Corporation, Houston, Tex.

[21] Appl. No.: 871,124

[22] Filed: Jun. 9, 1997

[51] Int. Cl.⁶ ................................. G06F 1/16; H05K 5/02
[52] U.S. Cl. ............................................. 361/683; 220/341
[58] Field of Search ..................................... 361/683, 685, 361/724–727; 312/223.1, 223.2; 220/341, 334, 337, 342; 364/708.1; 16/254, 260, 262, DIG. 13

[56] References Cited

U.S. PATENT DOCUMENTS

| | | | |
|---|---|---|---|
| 4,391,883 | 7/1983 | Williamson et al. | 429/97 |
| 5,316,168 | 5/1994 | Finch et al. | 220/341 |
| 5,460,441 | 10/1995 | Hastings et al. | 312/223.2 |
| 5,519,572 | 5/1996 | Luo | 361/685 |
| 5,542,757 | 8/1996 | Chang | 312/223.2 |
| 5,555,157 | 9/1996 | Moller et al. | 361/683 |
| 5,574,625 | 11/1996 | Ohgami et al. | 361/684 |

*Primary Examiner*—Lynn D. Feild
*Attorney, Agent, or Firm*—Konneker & Smith, P.C.

[57] ABSTRACT

A drive bay opening in the front bezel portion of a tower type computer CPU unit is provided with a swing-out plastic access door. The door is pivotable between a closed position and a full open stop position in which it is outwardly pivoted more than ninety degrees away from its closed position. A specially designed concealed, break-away hinge structure removably interconnects the access door and front bezel portion and includes a pair of hinge arms projecting outwardly from the door and molded integrally therewith. Outer end tabs in the hinge arms have apertures therein that rotatably receive domed hinge pins within recesses in the bezel. In the event that the access door is forcibly pivoted outwardly beyond its full open stop position the domed hinge pins act as cams that torsionally deflect the hinge tabs out of engagement therewith. As a result, the door simply pops off the bezel without damaging either the door, the hinge structure or the bezel. The hinge arm tabs of the separated, undamaged access door may subsequently be snapped back onto the domed pins, with chamfered edge portions of the tabs initially engaging the domed portions of the pins to torsionally deflect the tabs in a manner facilitating their reconnection to the hinge pins on the bezel.

40 Claims, 5 Drawing Sheets

PIVOTABLE COMPUTER ACCESS DOOR STRUCTURE HAVING CONCEALED, BREAK-AWAY HINGE MECHANISM

BACKGROUND OF THE INVENTION

1. Field of the Invention

The present invention generally relates to electronic devices such as computers and, in a preferred embodiment thereof, more particularly relates to access door structures installed on computer housings.

2. Description of Related Art

The housings of electronic devices such as computers are often formed of a molded plastic material and provided with exterior openings to afford user access to devices within the housing. An example of such a housing opening is a tower type computer drive bay opening extending through an outer front bezel portion of the computer housing structure. Housing openings of this sort are typically provided with an access door structure, also commonly of a molded plastic material, to selectively block and expose the housing opening. A common type of access door is one that is rotatably secured to the housing bezel, by a hinge structure, for pivotal movement relative thereto between (1) a closed position, in which the door extends across and covers the housing opening, and (2) an outwardly pivoted open limit position in which the opening is uncovered and the door is precluded from further opening movement by the abutment of an inner edge portion thereof with a facing portion of the bezel.

Hinged molded plastic access doors of this type are typically subject to several well known problems, limitations and disadvantages. For example, many of the access doors have exposed hinge structures which are subject to damage and tend to be unsightly. Other previously utilized access doors cannot be outwardly pivoted past about ninety degrees from their closed positions, thereby often hindering access to their associated bezel opening.

Yet another problem commonly associated with previously utilized hinged access doors of this sort is that if they are forcibly pivoted outwardly past their open limit position, breakage occurs in the door and/or the associated bezel structure portion requiring that one or both be replaced. In a previously proposed solution to this over-pivot breakage problem a computer housing access door was provided with a pair of outwardly projecting hinge arms having outer ends that rotatably engage hinge pin structures on the housing bezel structure.

Each hinge arm was formed from two releasably telescoped longitudinal sections which, when the door was pivoted outwardly past its open limit position, were designed to longitudinally separate from one another to permit the door and the inner hinge arm sections to break away from the outer hinge arm sections, without damage thereto, in a manner permitting the undamaged door to be replaced on the bezel by re-telescoping the inner and outer hinge arm sections. This design, however, is relatively complex and expensive, and does not provide consistent damage-free break-away action for the access door.

As can readily be seen from the foregoing, a need exists for a pivotally supported computer housing opening access door which has a concealed hinge structure, has a total closed-to-fully open pivotal travel range of more than ninety degrees, and has damage free break-away and replacement capabilities.

SUMMARY OF THE INVENTION

In carrying out principles of the present invention, in accordance with a preferred embodiment thereof, an electronic device, representatively a tower type CPU unit portion of a computer system, has a housing with an external wall structure opening therein, illustratively a drive bay opening. The electronic device also includes an access door, and first and second interengaged hinge portions respectively carried by the access door and the housing.

The first and second interengaged hinge portions combinatively define a break-away hinge structure that operates to (1) support the access door for pivotal movement relative to the housing, about a pivot axis, between a closed position and an open limit position in which the access door respectively covers and uncovers the wall opening, and (2) permits the access door to be replaceably detached from the housing, in response to forcibly pivoting the access door outwardly beyond its open limit position, by creating between the first and second hinge portions a resilient camming interaction which disengages them. Preferably, this camming interaction resiliently deflects one of the first and second hinge portions generally parallel to the pivot axis.

According to other aspects of the invention, the hinge structure is concealed from view when the access door is closed, and permits the access door to be supported for pivotal movement between its closed and open limit positions through a rotational arc greater than ninety degrees to improve access to the housing wall opening.

In a preferred embodiment thereof, the hinge structure includes spaced first and second hinge arm members with body portions extending outwardly from the access door in first directions and having lateral cutout portions therein which facilitate the concealment of the hinge structure and the ability of the access door to pivot outwardly beyond ninety degrees to its open limit position. At the outer ends of these body portions are transverse mounting tabs which have circular mounting holes in their outer ends, and chamfered corner portions on outer side edges thereof. Preferably, the access door and the two hinge arms are integral portions of a plastic molding.

The break-away hinge structure also includes first and second hinge pin members which are preferably recessed in spaced apart hinge pocket areas of the housing wall structures and have cam surfaces, representatively of domed configurations, on their outer ends. With the access door operatively attached to the housing, these domed pin ends are rotatably received in the hinge arm tab openings and support the access door for pivotal movement between its closed and open limit positions relative to the housing.

When the mounted access door it forcibly pivoted outwardly beyond its open limit position, the domed pin ends cammingly deflect the hinge arm tabs out of engagement therewith, thereby separating the access door from the housing without damaging the door, the hinge structure or the housing. The cammed deflection of the tabs is effected in a manner torsionally deflecting the hinge arm portions about axes parallel to the aforementioned first directions and transverse to the pivot axis of the door.

The detached access door may be easily and quickly remounted on the housing by pressing the chamfered tab edge surfaces against the domed pin ends to cause the domed pin ends to deflect the tabs, in a manner similar to the detachment deflections thereof, and slide along outer side surfaces of the tabs until the pin ends operatively snap back into their associated hinge arm tab openings.

DETAILED DESCRIPTION

Figure 1:
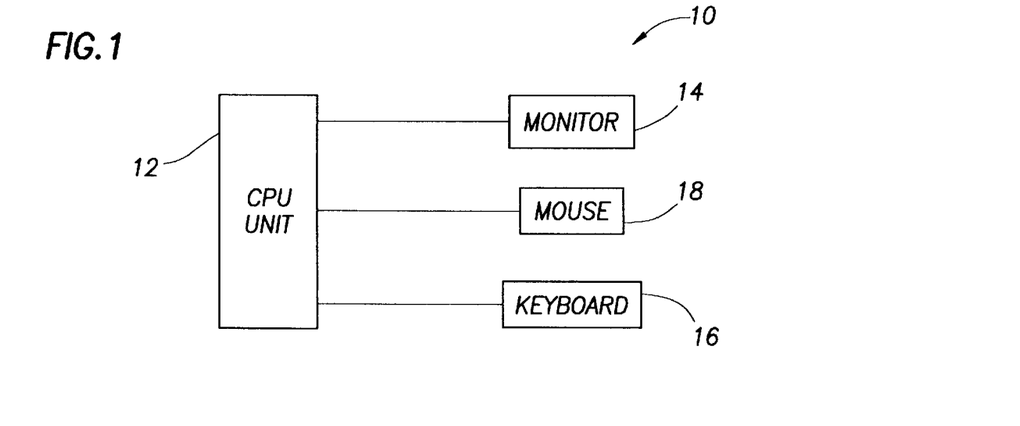
FIG. 1 is a schematic diagram of a computer system having incorporated therein a tower type CPU unit with a specially designed concealed hinge, break-away drive bay access door assembly embodying principles of the present invention.
Figure 2A:
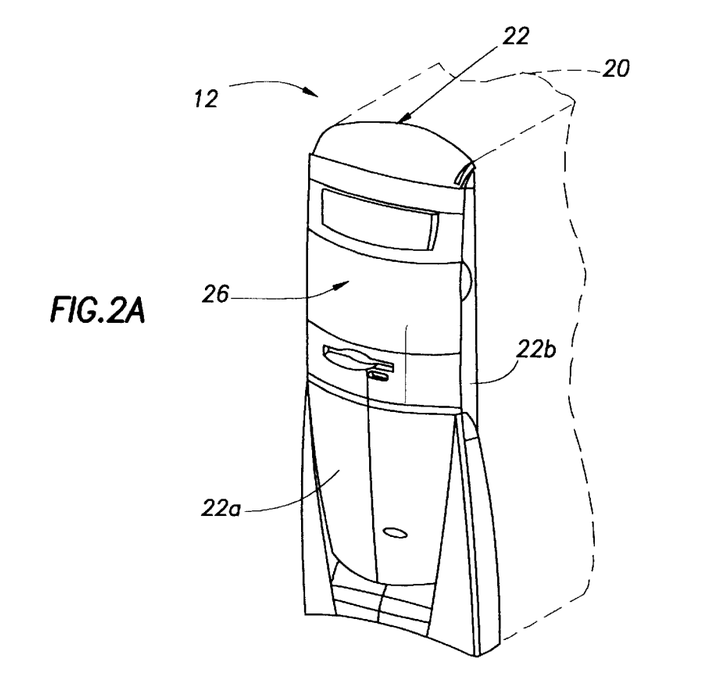
FIG. 2A is a partially phantomed perspective view of a front side portion of the CPU unit with the drive bay access door closed.
Figure 2B:
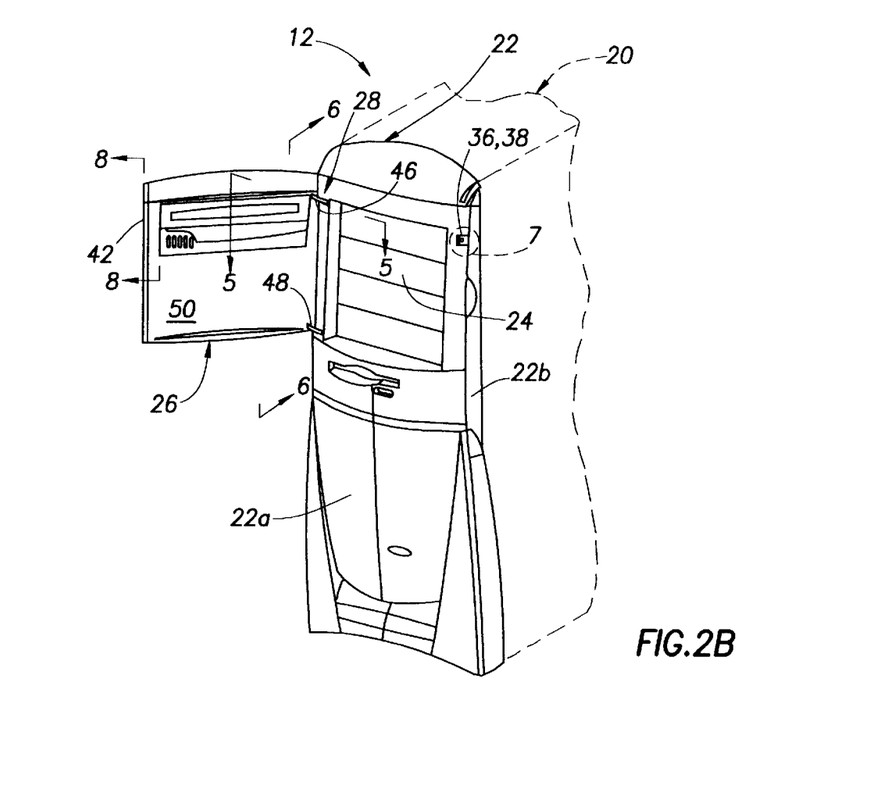
FIG. 2B is a partially phantomed perspective view of the front side portion of the CPU unit with the drive bay access door opened to its limit position.

Schematically illustrated in FIG. 1 is a representative computer system 10 including a computer, illustratively in the form of a tower type CPU unit 12; a monitor 14; a keyboard 16; and a pointing device, representatively in the form of a mouse 18. As illustrated in FIGS. 2A and 2B, the CPU unit 12 has a generally rectangular housing portion 20 with a vertical front side portion being defined by a molded plastic bezel assembly 22 having a front portion 22a nested with and suitably fastened to a rear portion 22b.

Figure 3:
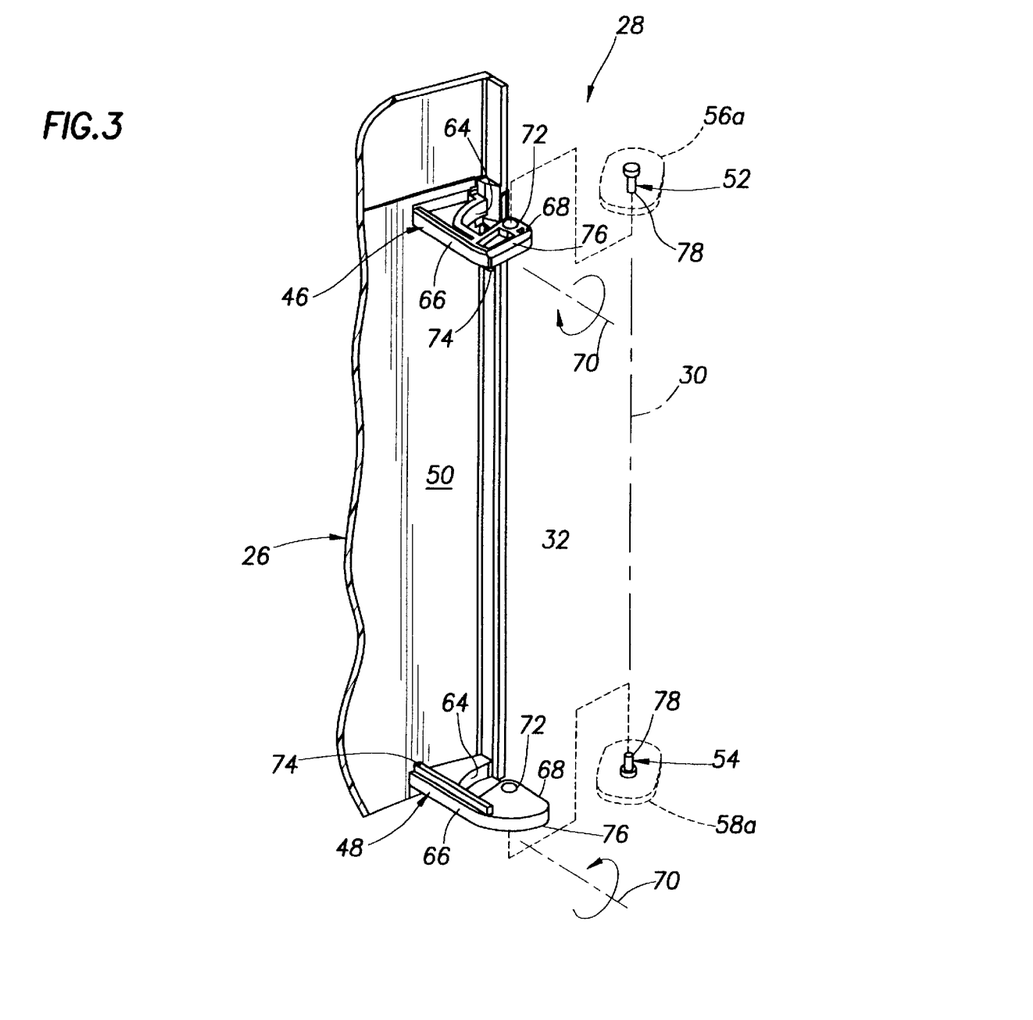
FIG. 3 is an enlarged scale inner side perspective view of a hinge area side edge portion of the access door removed from the CPU unit housing.

Formed in an upper portion of the bezel assembly 22 is a generally rectangular opening, representatively a drive bay opening 24. To selectively cover and uncover the opening 24 a generally rectangular molded plastic access door 26 is provided. The access door 26 is removably secured to the bezel structure 22 by a specially designed concealed, break-away hinge structure 28 (see FIGS. 2B, 3 and 5) which embodies principles of the present invention.

Hinge structure 28 removably mounts the access door 26 on the bezel structure 22 for pivotal motion relative thereto, about a vertical pivot axis 30 (see FIGS. 3 and 4) between a closed position in which the access door 26 covers the housing wall structure opening 24 (see FIG. 2A), and an open limit position (see FIGS. 2B and 5) in which the access door 26 uncovers the opening 24. In its open limit position the access door 26 is swung outwardly from its closed position through a rotational arc of more than ninety degrees (preferably about 110 degrees), with an inturned inner side edge lip 32 of the door 26 (see FIGS. 3–5) bearing against a facing vertical outer side wall portion 34 of the bezel structure 22 (see FIGS. 5 and 6) and blocking further outward pivotal movement of the door 26.

Figure 7:
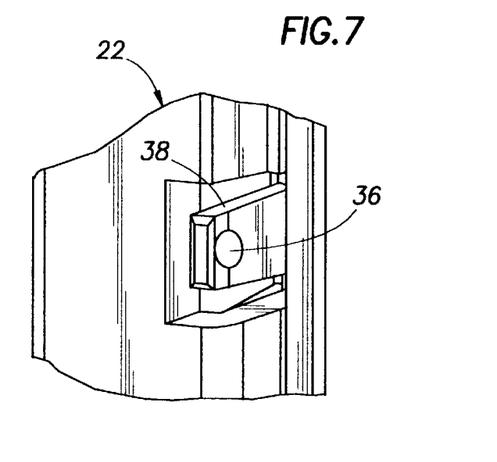
FIG. 7 is an enlarged scale perspective detail view of the dashed circle area "7" in FIG. 2B.
Figure 8:
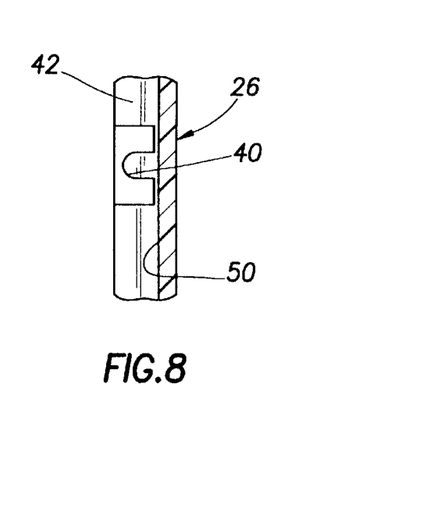
FIG. 8 is an enlarged scale elevational view of an outer edge portion of the access door taken along line 8—8 of FIG. 2B.

A latch structure is provided for releasably holding the access door 26 in its closed position over the drive bay opening 24 and representatively includes a partially spherical detent projection 36 formed on a resilient tab section 38 of the bezel structure adjacent an upper right corner of the drive bay opening 24 (see FIGS. 2B and 7), and a detent recess 40 formed on the inner side of an inturned outer side edge lip portion 42 of the access door 26 (see FIGS. 2B and 8). When the access door 26 is closed, the door lip portion 42 engages the detent projection 36 and inwardly cams the tab 38 until the detent projection 36 pops outwardly into the detent recess 40. When the access door 26 is subsequently pulled open, the tab 38 is again inwardly deflected to free the detent projection 36 from its associated door recess 40.

According to a key feature of the present invention, as later described herein if the access door 26 is forcibly pivoted outwardly beyond its open limit position (i.e., from its solid line position to its dotted line position in FIG. 5 as indicated by the arrow 44) the specially designed hinge structure 28 permits the door to simply pop off the bezel structure 22 without appreciably damaging the bezel structure 22, the access door 26 or the hinge structure 28. As also later described herein the unique concealed hinge structure 28 also permits the detached access door 28 to be simply and quickly snapped back into operative pivotal mounting engagement with the bezel structure 22 without requiring tools of any sort.

Turning now to FIGS. 3–6, the hinge structure 28 includes (1) upper and lower elongated hinge arm members 46,48 longitudinally extending inwardly from the inner side surface 50 of the access door 26 adjacent its inner side edge lip 32 (see FIGS. 3–5), and (2) upper and lower hinge pin members 50,52 (see FIGS. 3 and 6) which are formed on the bezel structure 22, vertically spaced apart along the pivot axis 30, and respectively disposed in forwardly opening upper and lower hinge pockets 56,58 formed in a vertical front side wall portion 60 of the bezel structure 22 adjacent inner side notches 62 its side wall portion 34.

Each of the upper and lower hinge arms 46,48 is preferably molded as an integral part of the plastic access door 26 and has a relatively small vertical thickness, a longitudinally intermediate cutout area 64 horizontally extending into the hinge arm body and forming a narrowed body portion 66 in the hinge arm, and a horizontally projecting transverse outer tab portion 68 which is generally perpendicular to the longitudinal axis 70 of the body portion 66 and to the pivot axis 30. Extending vertically through the outer end of the tab portion 68 is a circular mounting opening 72. Stiffening ribs 74 are formed on the hinge arm bodies and, for purposes later described herein, each of the tabs 68 has a chamfered outer side corner surface area 76 thereon. The chamfered surface 76 on the upper hinge arm tab 68 is on its upper outer side corner, while the chamfered surface 76 on the lower hinge arm tab 68 is on its lower outer side corner.

The upper hinge pin member 52 extends downwardly from an upper wall portion 56a of the upper hinge pocket 56 (see FIGS. 3 and 6), and the lower hinge pin member 54 extends upwardly from a bottom wall portion 58a of the lower hinge pocket 58. The surfaces of outer end portions 78 of the upper and lower hinge pin members 52,54 act as cam surfaces as later described herein, and preferably have domed configurations. With the hinge arms 46,48 operatively installed on their associated hinge pins 52,54 the domed outer end portion 78 of the upper hinge pin 52 extends downwardly into and is rotatably received in the tab opening 72 of the upper hinge arm 46 (see FIG. 9), and the domed outer end portion 78 of the lower hinge pin 54 extends upwardly into and is rotatably received in the tab opening 72 of the lower hinge arm 48.

Figure 5:
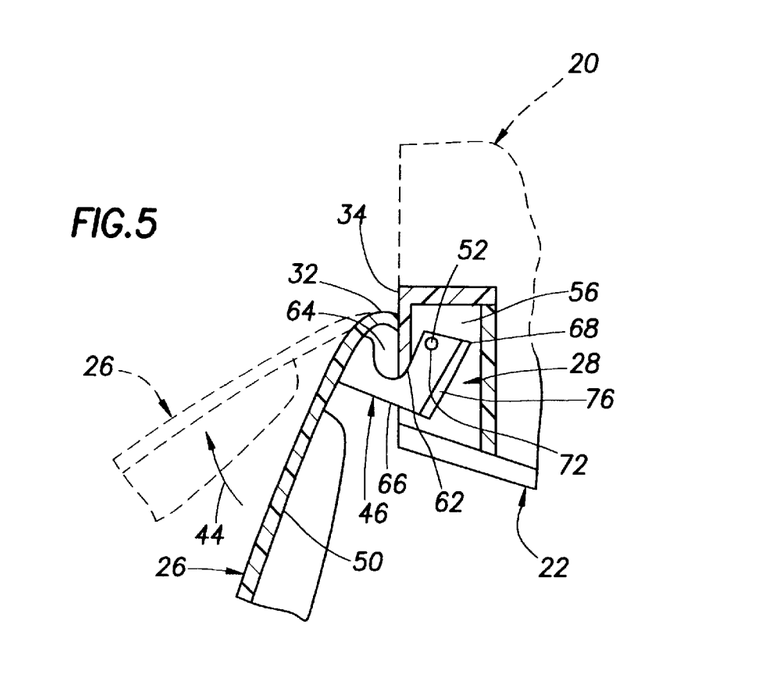
FIG. 5 is an enlarged scale simplified cross-sectional view through an upper access door hinge area of the CPU unit taken along line 5—5 of FIG. 2B.
Figure 6:
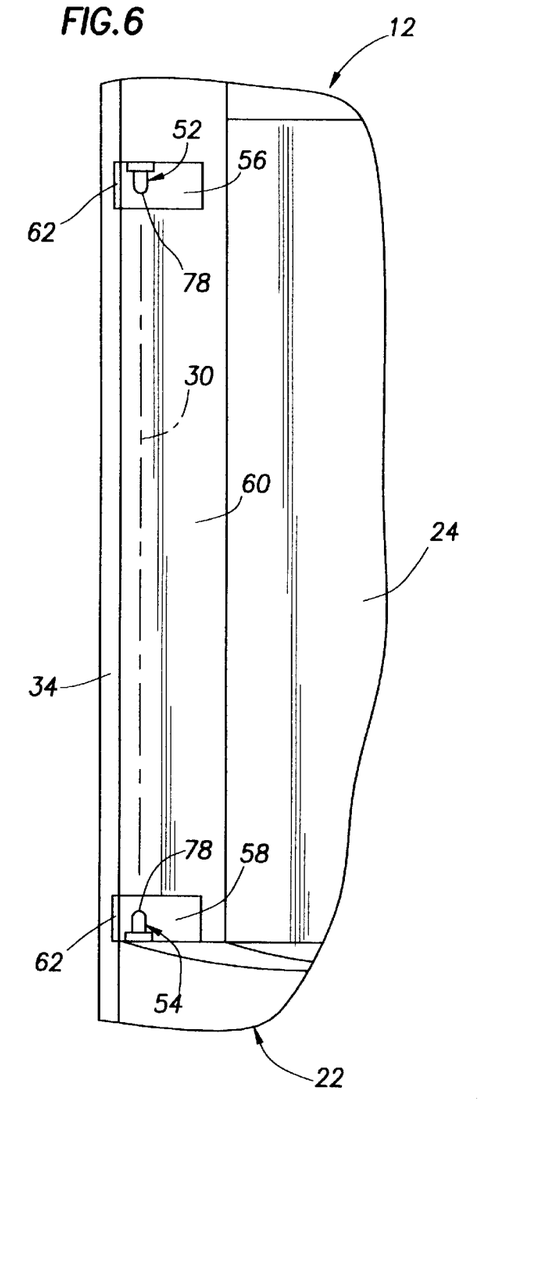
FIG. 6 is an enlarged scale simplified front elevational view of an access door hinge area of the CPU unit, with the access door removed therefrom, taken along line 6—6 of FIG. 2B.

As can be seen in FIG. 5, the cutout areas 64 in the upper and lower hinge arms 46,48 facilitate the access door 26 being able to be outwardly rotated from its closed position through an arc of more than ninety degrees, to provide easier insertion and removal access to the drive bay opening 24, by permitting a forward edge section of the bezel wall portion 34 to enter the cutout areas 64. The notches 62 in the front edge of the wall portion 34 also facilitate this pivoting past the ninety degree mark, as additionally illustrated in FIG. 5.

When the access door 26 is in its FIG. 2A closed position, the hinge structure 28 (i.e., the hinge arms 46,48 and the domed hinge pins 52,54) are completely concealed from view behind the closed door 26. This hinge structure concealment is facilitated by the tab cutout areas 64 which permits the hinge pins 52,54 to be rearwardly recessed into the upper and lower hinge pockets 56 and 58.

As previously mentioned, an additional advantage provided by the hinge structure 28 is that it provides the access door 26 to be "broken away" from the bezel structure 22, and then replaced thereon, without damage to the bezel structure 22, the access door 26 or the hinge structure 28, when the door 26 is inadvertently (or intentionally) pivoted outwardly past its solid line open limit position (as indicated by the arrow 44 in FIG. 5) to the door's dashed line detached position also shown in FIG. 5.

Figure 4:
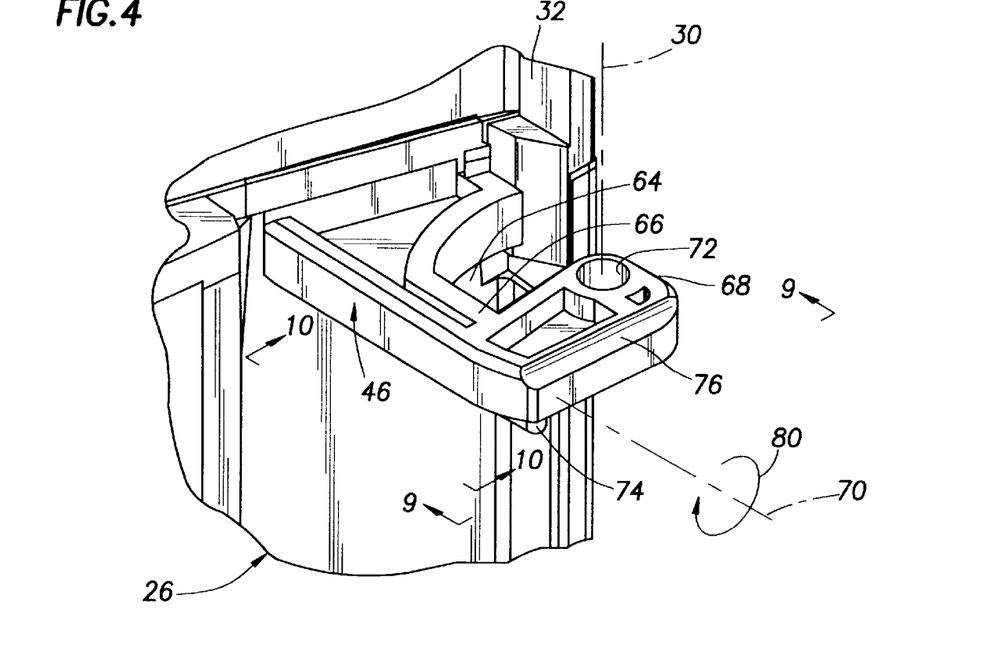
FIG. 4 is an enlarged scale perspective detail view of an upper hinge arm portion of the access door.
Figure 9:
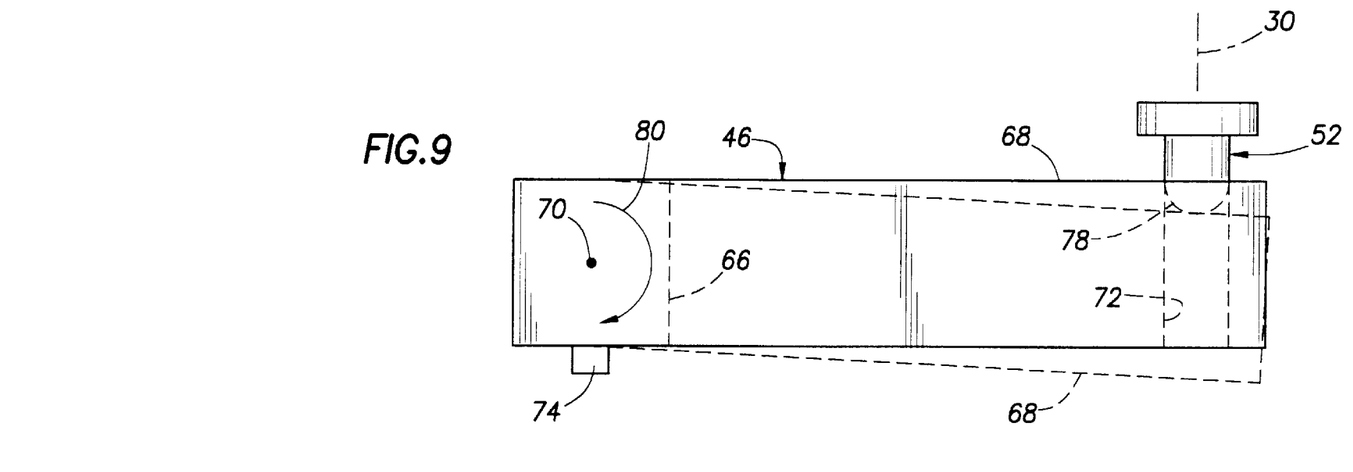
FIG. 9 is an enlarged scale, schematic elevational view of the access door upper hinge arm taken along line 9—9 of FIG. 4 and illustrating its camming disengagement interaction with a domed mounting pin portion of the door hinge structure.

Referring now to FIGS. 4 and 9, when the access door 26 in its open limit position is subjected to this pivotal detachment force, the domed hinge pin ends 78 received in the hinge arm tab members 46,48 cammingly deflect the tabs 46,48 about the hinge arm body axes 70, as indicated by the arrows 80 in FIGS. 4 and 9, in a manner torsionally deforming the hinge arm body portions 66 about the axes 70 and disengaging the pins 52,54 from their associated tab openings 72, thereby freeing the access door 26 from the bezel structure 22. During this camming interengagement between the domed pin ends 78 and the interior surfaces of the tab openings 72, the upper pin 52 downwardly deflects the upper tab 68 from its solid line position in FIG. 9 to its dashed line position therein, while the lower pin 54 similarly deflects the lower tab 68 upwardly. The camming interengagement between the domed pin ends 78 and the tabs 68 prevents a pure shear stress from being exerted on the pins which could break them or damage the hinge arms, the access door or the bezel structure.

Figure 10:
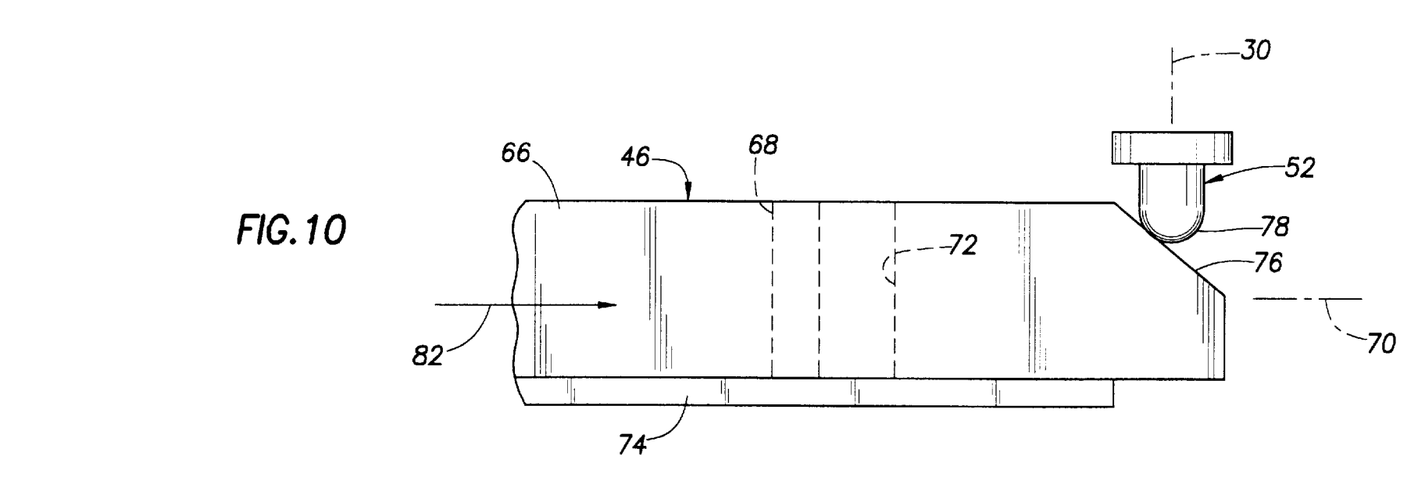
FIG. 10 is an enlarged scale, schematic elevational view of the access door upper hinge arm taken along line 10—10 of FIG. 4 and illustrating its camming reattachment interaction with the domed mounting pin.

To operatively reattach the separated access door 26 to the bezel structure 22 easily, quickly and without tools of any sort, all that is necessary is to orient the door in a manner such that the chamfered tab engage 76 (see FIG. 10) engaged the domed pin ends 78, and then push the tabs 68 horizontally toward the pins 52,54 as indicated by the arrow 82 in FIG. 10. The resulting camming interaction between the domed ends 78 of the hinge pins with the chamfered tab surfaces 76 resiliently deflects the tabs 68 in a manner similar to that shown in FIG. 9, thereby permitting the domed pin ends 78 to slide across the outer sides of the tabs (i.e., the top side of the upper tab 68 and the bottom side of the lower tab 68) until the pin ends 78 snap back into their associated tab openings 72 to rotationally reattach the tabs to the pins.

While the access door 26 and the associated concealed, break-away hinge structure 28 have been illustrated as being incorporated in conjunction with a drive bay opening in a tower type CPU unit, it will be readily appreciated that the door mounting principles of the present invention could alternatively utilized to advantage with other types of wall openings in other structures such as, for example, other types of computers and electronic device housings.

The foregoing detailed description is to be clearly understood as being given by way of illustration and example only, the spirit and scope of the present invention being limited solely by the appended claims.

What is claimed is:

1. An electronic device comprising:

a housing having a wall opening therein;

an access door; and first and second pivotally interengaged hinge portions respectively carried by said access door and said housing, said first and second hinge portions:

(1) supporting said access door for pivotal movement relative to said housing, about a pivot axis, between a closed position and an open limit position in which said access door respectively covers and uncovers said wall opening, and (2) permitting said access door to be replaceable detached from said housing, in response to forcibly pivoting said access door outwardly beyond said open limit position, by creating between said first and second hinge portions a resilient camming interaction which disengages them in a manner leaving said second hinge portion in place on said housing.

2. The electronic device of claim 1 wherein said electronic device is a computer.

3. The electronic device of claim 2 wherein said computer is a tower CPU unit.

4. The electronic device of claim 2 wherein said wall opening is a drive bay opening.

5. The electronic device of claim 1 wherein said camming interaction resiliently deflects one of said first and second hinge portions generally parallel to said pivot axis.

6. The electronic device of claim 5 wherein said first hinge portion includes spaced apart first and second hinge arms projecting outwardly from said access door and having outer end portions rotatably and cammingly interengaged with said second hinge portion.

7. The electronic device of claim 6 wherein said access door and said first and second hinge arms are integral portions of a plastic molding.

8. The electronic device of claim 1 wherein, with said access door in said closed position thereof, said first and second interengaged hinge portions are concealed from view.

9. The electronic device of claim 1 wherein the rotational arc between said closed and open limit positions of said access door is more than ninety degrees.

10. An electronic device comprising:

a housing having a wall opening therein;

an access door; and first and second interengaged hinge portions respectively carried by said access door and said housing, said first and second hinge portions:

(1) supporting said access door for pivotal movement relative to said housing, about a pivot axis, between a closed position and an open limit position in which said access door respectively covers and uncovers said wall opening, and (2) permitting said access door to be replaceably detached from said housing, in response to forcibly pivoting said access door outwardly beyond said open limit position, by creating between said first and second hinge portions a resilient camming interaction which disengages them said camming interaction resiliently deflecting one of said first and second hinge portions generally parallel to said pivot axis, said first hinge portion including spaced apart first and second hinge arms projecting outwardly from said access door and having outer end portions rotatably and cammingly interengaged with said second hinge portion, said first and second hinge arms having body portions extending outwardly from said access door in first directions generally transverse to said pivot axis, and said outer end portions of said first and second hinge arms being configured to torsionally deflect said body portions, about axes generally parallel to said first directions, in response to said resilient camming interaction between said first and second hinge portions.

11. The electronic device of claim 10 wherein said outer end portions of said first and second hinge arms extend generally transversely to said pivot axis and said first directions.

12. The electronic device of claim 11 wherein said outer end portions are telescopingly interengaged with said second hinge portion.

13. The electronic device of claim 12 wherein:

said outer end portions have openings therein, and said second hinge portion includes a spaced pair of mounting projections disposed on said housing and having cam surface portions rotatably received in said outer end portion openings.

14. The electronic device of claim 13 wherein said pair of mounting projections are hinge pin members, and said cam surface portions are domed end surfaces of said hinge pin members.

15. An electronic device comprising:

a housing having a wall opening therein;

an access door; and first and second interengaged hinge portions respectively carried by said access door and said housing, said first and second hinge portions:
 (1) supporting said access door for pivotal movement relative to said housing, about a pivot axis, between a closed position and an open limit position in which said access door respectively covers and uncovers said wall opening, and
 (2) permitting said access door to be replaceable detached from said housing, in response to forcibly pivoting said access door outwardly beyond said open limit position, by creating between said first and second hinge portions a resilient camming interaction which disengages them, said camming interaction resiliently deflecting one of said first and second hinge portions generally parallel to said pivot axis, said first hinge portion including spaced apart first and second hinge arms projecting outwardly from said access door and having outer end portions rotatable and cammingly interengaged with said second hinge portion, and said outer end portions having tapered edge surfaces thereon which, subsequent to detachment of said access door from said housing, may be pressed against said second hinge portion to resiliently deflect said outer end portions in a manner facilitating the operative re-engagement of said outer end portions and said second hinge portion.

16. An electronic device comprising:

a housing having a wall opening therein;

an access door; and first and second interengaged hinge portions respectively carried by said access door and said housing, said first and second hinge portions:
 (1) supporting said access door for pivotal movement relative to said housing, about a pivot axis, between a closed position and an open limit position in which said access door respectively covers and uncovers said wall opening, and
 (2) permitting said access door to be replaceably detached from said housing, in response to forcibly pivoting said access door outwardly beyond said open limit position, by creating between said first and second hinge portions a resilient camming interaction which disengages them, said camming interaction resiliently deflecting one of said first and second hinge portions generally parallel to said pivot axis, said first hinge portion including spaced apart first and second hinge arms projecting outwardly from said access door and having outer end portions rotatably and cammingly interengaged with said second hinge portion, and said outer end portions being telescopingly interengaged with said second hinge portions.

17. The electronic device of claim 16 wherein:

said outer end portions have openings therein, and said second hinge portions include a spaced pair of mounting projections disposed on said housing and having cam surface portions rotatably received in said outer end portion openings.

18. The electronic device of claim 16 wherein said pair of mounting projections are hinge pin members, and said cam surface portions are domed end surfaces of said hinge pin members.

19. An electronic device comprising:

a housing having an external wall structure with an access opening and a spaced first and second hinge recesses therein;

first and second hinge support projections respectively disposed in said first and second hinge recesses and having sloped outer end portions;

an access door; and first and second spaced apart hinge arm members having body portions extending outwardly from said access door in first directions and having transverse outer end portions with openings therein that rotatably receive said sloped outer end portions of said first and second hinge support projections and support said access door for pivotal motion relative to said housing, about a pivot axis, between closed and open limit positions in which said access door respectively covers and uncovers said access opening, said sloped outer end portions of said first and second hinge support projections and the interior surfaces of said hinge arm member outer end portion openings being cooperative to permit said access door to be replaceably detached from said housing, in response to forcibly pivoting said access door outwardly beyond said open limit position, by cammingly deflecting said hinge arm member outer end portions out of engagement with said first and second hinge support projections in a manner torsionally and resiliently deforming said hinge arm member body portions about axes generally transverse to said pivot axis and said first directions.

20. The electronic device of claim 19 wherein said electronic device is a computer.

21. The electronic device of claim 20 wherein said computer is a tower type CPU unit.

22. The electronic device of claim 21 wherein said external wall structure is a plastic bezel structure.

23. The electronic device of claim 22 wherein said access opening is a drive bay opening.

24. The electronic device of claim 19 wherein said access door and said first and second spaced apart hinge arm members are integral portions of a plastic molding.

25. The electronic device of claim 19 wherein said closed and open limit positions of said access door are rotationally separated by an arc of more than ninety degrees.

26. The electronic device of claim 25 wherein said first and second hinge arm members have side cutout areas formed therein which facilitate the pivotal opening movement of said access door more than ninety degrees from its closed position.

27. The electronic device of claim 19 wherein, when said access door is in said closed position thereof, said first and second hinge support projections and said first and second hinge arm members are concealed from view.

28. The electronic device of claim 19 wherein said first and second hinge support projections are hinge pin projections with domed outer end portions.

29. The electronic device of claim 19 wherein said outer end portions of said first and second hinge arm members have tapered outer end edge surfaces which, subsequent to detachment of said access door from said housing, may be pressed against said sloped outer end portions of said first and second hinge support projections to resiliently deflect said first and second hinge arm member outer end portions in a manner facilitating the operative re-engagement of said first and second hinge arm member outer end portions and said first and second hinge support projections.

30. The electronic device of claim 19 wherein said first and second hinge arm members have stiffening ribs disposed thereon and elongated in said first directions.

31. An access door for selectively covering and uncovering an opening in a wall structure having spaced apart door support portions adjacent the opening, said access door comprising:
   a base wall; and
   a spaced apart plurality of mounting projections extending outwardly from said base wall and having outer end portions removably connectable to the door support portions in a manner mounting said access door on the wall structure for pivotal movement relative thereto, about a pivot axis, between open and closed positions, said outer end portions of said mounting projections, in response to a forcible detachment motion thereof in a direction transverse to said pivot axis, being resiliently deflectable by the door support portions, in a direction parallel to said pivot axis, in a manner disconnecting said outer end portions from the door support portions without damaging said access door or the wall structure.

32. The access door of claim 31 wherein said access door is a computer housing access door.

33. The access door of claim 32 wherein said computer housing access door is a drive bay access door.

34. The access door of claim 31 wherein said access door is a plastic molding with said mounting projections being formed integrally with said base wall.

35. A computer system comprising a monitor, a keyboard, and a CPU portion operatively associateable with said monitor and said keyboard and having:
   a housing having a wall opening therein;
   an access door; and
   first and second pivotally interengaged hinge portions respectively carried by said access door and said housing, said first and second hinge portions:
   (1) supporting said access door for pivotal movement relative to said housing, about a pivot axis, between a closed position and an open limit position in which said access door respectively covers and uncovers said wall opening, and
   (2) permitting said access door to be replaceably detached from said housing, in response to forcibly pivoting said access door outwardly beyond said open limit position, by creating between said first and second hinge portions a resilient camming interaction which disengages them in a manner leaving said second hinge portion in place on said housing.

36. The computer system of claim 35 wherein aid CPU portion is a tower type CPU unit.

37. The computer system of claim 36 wherein said wall opening is a drive bay opening.

38. A computer system comprising a monitor, a keyboard, and a CPU portion operatively associateable with said monitor and said keyboard and having:
   a housing having an external wall structure with an access opening and a spaced first and second hinge recesses therein;
   first and second hinge support projections respectively disposed in said first and second hinge recesses and having sloped outer end portions;
   an access door; and
   first and second spaced apart hinge arm members having body portions extending outwardly from said access door in first directions and having transverse outer end portions with openings therein that rotatably receive said sloped outer end portions of said first and second hinge support projections and support said access door for pivotal motion relative to said housing, about a pivot axis, between closed and open limit positions in which said access door respectively covers and uncovers said access opening,
   said sloped outer end portions of said first and second hinge support projections and the interior surfaces of said hinge arm member outer end portion openings being cooperative to permit said access door to be replaceably detached from said housing, in response to forcibly pivoting said access door outwardly beyond said open limit position, by cammingly deflecting said hinge arm member outer end portions out of engagement with said first and second hinge support projections in a manner torsionally and resiliently deforming said hinge arm member body portions about axes generally transverse to said pivot axis and said first directions.

39. The computer system of claim 38 wherein said CPU portion is a tower type CPU unit.

40. The computer system of claim 39 wherein said wall opening is a drive bay opening.

* * * * *